(12) United States Patent
Blake et al.

(10) Patent No.: US 8,364,518 B1
(45) Date of Patent: Jan. 29, 2013

(54) SYSTEMS AND METHODS FOR FORECASTING HOUSEHOLD ECONOMICS

(75) Inventors: Neil Blake, London (GB); Paul Watts, Oker (GB); Eric McVittie, Crieff (GB)

(73) Assignee: Experian Ltd., Nottingham (GB)

( * ) Notice: Subject to any disclaimer, the term of this patent is extended or adjusted under 35 U.S.C. 154(b) by 0 days.

(21) Appl. No.: 13/026,856

(22) Filed: Feb. 14, 2011

Related U.S. Application Data (63) Continuation of application No. 12/831,946, filed on Jul. 7, 2010, now abandoned.

(60) Provisional application No. 61/223,978, filed on Jul. 8, 2009.

(51) Int. Cl.
*G06Q 10/00* (2012.01)
(52) U.S. Cl. .................................................... 705/7.32
(58) Field of Classification Search .................. 705/7.32
See application file for complete search history.

(56) References Cited

U.S. PATENT DOCUMENTS

| | | | |
|---|---|---|---|
| 4,775,935 A | 10/1988 | Yourick | |
| 4,827,508 A | 5/1989 | Shear | |
| 4,868,570 A | 9/1989 | Davis | |
| 4,872,113 A | 10/1989 | Dinerstein | |
| 4,935,870 A | 6/1990 | Burk, Jr. et al. | |
| 5,056,019 A | 10/1991 | Schultz et al. | |
| 5,247,575 A | 9/1993 | Sprague et al. | |
| 5,325,509 A | 6/1994 | Lautzenheiser | |
| 5,341,429 A | 8/1994 | Stringer et al. | |
| 5,528,701 A | 6/1996 | Aref | |
| 5,555,409 A | 9/1996 | Leenstra, Sr. et al. | |
| 5,592,560 A | 1/1997 | Deaton et al. | |
| 5,640,551 A | 6/1997 | Chu et al. | |
| 5,655,129 A | 8/1997 | Ito | |
| 5,659,731 A | 8/1997 | Gustafson | |
| 5,666,528 A | 9/1997 | Thai | |
| 5,737,732 A | 4/1998 | Gibson et al. | |
| 5,754,938 A | 5/1998 | Herz et al. | |
| 5,768,423 A | 6/1998 | Aref et al. | |
| 5,774,692 A | 6/1998 | Boyer et al. | |
| 5,778,405 A | 7/1998 | Ogawa | |
| 5,797,136 A | 8/1998 | Boyer et al. | |
| 5,812,840 A | 9/1998 | Shwartz | |
| 5,822,410 A | 10/1998 | McCausland et al. | |
| 5,822,750 A | 10/1998 | Jou et al. | |

(Continued)

FOREIGN PATENT DOCUMENTS

| | | |
|---|---|---|
| EP | 0419889 A2 | 4/1991 |
| EP | 0458698 A | 11/1991 |

(Continued)

OTHER PUBLICATIONS

What is Mosaic. from www.appliedgeographic.com/mosaic.html as access from www.archive.org dated Feb. 15, 2004.*

(Continued)

*Primary Examiner* — Johnna Loftis
(74) *Attorney, Agent, or Firm* — Knobbe Martens Olson & Bear LLP (57) ABSTRACT

Systems and methods of forecasting household economic data. In one embodiment, the forcast is made based on a macroeconomic scenario. In this aspect, a storage media of a computer maintains household survey records, and geodemographic segment identifiers are added to those records. A computer processor is used to aggregate the household survey records by geodemographic segments. The resulting segment-level records can be applied to an econometric model, and the model can use macroeconomic forecast assumptions related to the macroeconomic scenario, thus producing economic forecasts for the geodemographic segments. The economic forecasts that are produced may include predicted income and expenditures for each of the geodemographic segments.

16 Claims, 10 Drawing Sheets

U.S. PATENT DOCUMENTS

| | | | |
|---|---|---|---|
| 5,822,751 A | 10/1998 | Gray et al. | |
| 5,825,884 A | 10/1998 | Zdepski et al. | |
| 5,835,915 A | 11/1998 | Carr et al. | |
| 5,881,131 A | 3/1999 | Farris et al. | |
| 5,884,287 A | 3/1999 | Edesess | |
| 5,905,985 A | 5/1999 | Malloy et al. | |
| 5,926,800 A | 7/1999 | Baronowski et al. | |
| 5,963,932 A | 10/1999 | Jakobsson et al. | |
| 5,974,396 A | 10/1999 | Anderson et al. | |
| 6,009,415 A | 12/1999 | Shurling et al. | |
| 6,018,723 A | 1/2000 | Siegel et al. | |
| 6,044,357 A | 3/2000 | Garg | |
| 6,073,140 A | 6/2000 | Morgan et al. | |
| 6,121,901 A | 9/2000 | Welch et al. | |
| 6,128,624 A | 10/2000 | Papierniak et al. | |
| 6,144,957 A | 11/2000 | Cohen et al. | |
| 6,151,601 A | 11/2000 | Papierniak et al. | |
| 6,182,060 B1 | 1/2001 | Hedgcock et al. | |
| 6,223,171 B1 | 4/2001 | Chaudhuri et al. | |
| 6,256,630 B1 | 7/2001 | Gilai et al. | |
| 6,263,334 B1 | 7/2001 | Fayyad et al. | |
| 6,263,337 B1 | 7/2001 | Fayyad et al. | |
| 6,304,869 B1 | 10/2001 | Moore et al. | |
| 6,334,110 B1 | 12/2001 | Walter et al. | |
| 6,339,769 B1 | 1/2002 | Cochrane et al. | |
| 6,366,903 B1 | 4/2002 | Agrawal et al. | |
| 6,456,979 B1 | 9/2002 | Flagg | |
| 6,460,036 B1 | 10/2002 | Herz | |
| 6,496,819 B1 | 12/2002 | Bello et al. | |
| 6,505,168 B1 | 1/2003 | Rothman et al. | |
| 6,513,018 B1 | 1/2003 | Culhane | |
| 6,523,022 B1 | 2/2003 | Hobbs | |
| 6,523,041 B1 | 2/2003 | Morgan et al. | |
| 6,574,623 B1 | 6/2003 | Leung et al. | |
| 6,598,030 B1 | 7/2003 | Siegel et al. | |
| 6,631,496 B1 | 10/2003 | Li et al. | |
| 6,651,220 B1 | 11/2003 | Penteroudakis et al. | |
| 6,658,393 B1 | 12/2003 | Basch et al. | |
| 6,766,327 B2 | 7/2004 | Morgan, Jr. et al. | |
| 6,804,701 B2 | 10/2004 | Muret et al. | |
| 6,850,895 B2 | 2/2005 | Brodersen et al. | |
| 6,879,960 B2 * | 4/2005 | Nascenzi et al. | 705/14.4 |
| 6,934,714 B2 | 8/2005 | Meinig | |
| 6,983,478 B1 | 1/2006 | Grauch et al. | |
| 7,003,504 B1 | 2/2006 | Angus et al. | |
| 7,003,792 B1 | 2/2006 | Yuen | |
| 7,028,052 B2 | 4/2006 | Chapman et al. | |
| 7,039,607 B2 | 5/2006 | Watarai et al. | |
| 7,047,251 B2 | 5/2006 | Reed et al. | |
| 7,050,989 B1 | 5/2006 | Hurt et al. | |
| 7,054,828 B2 * | 5/2006 | Heching et al. | 705/7.32 |
| 7,082,435 B1 | 7/2006 | Guzman et al. | |
| 7,136,448 B1 | 11/2006 | Venkataperumal et al. | |
| 7,184,974 B2 | 2/2007 | Shishido | |
| 7,185,016 B1 | 2/2007 | Rasmussen | |
| 7,200,602 B2 | 4/2007 | Jonas | |
| 7,240,059 B2 | 7/2007 | Bayliss et al. | |
| 7,249,048 B1 * | 7/2007 | O'Flaherty | 705/7.27 |
| 7,277,900 B1 | 10/2007 | Ganesh et al. | |
| 7,296,734 B2 | 11/2007 | Pliha | |
| 7,328,169 B2 * | 2/2008 | Temares et al. | 705/7.33 |
| 7,367,011 B2 | 4/2008 | Ramsey et al. | |
| 7,370,044 B2 | 5/2008 | Mulhern et al. | |
| 7,376,603 B1 | 5/2008 | Mayr et al. | |
| 7,383,215 B1 | 6/2008 | Navarro et al. | |
| 7,403,942 B1 | 7/2008 | Bayliss | |
| 7,428,526 B2 * | 9/2008 | Miller et al. | 707/713 |
| 7,467,127 B1 | 12/2008 | Baccash | |
| 7,475,118 B2 | 1/2009 | Leiba et al. | |
| 7,483,842 B1 | 1/2009 | Fung et al. | |
| 7,536,346 B2 | 5/2009 | Aliffi et al. | |
| 7,596,512 B1 | 9/2009 | Raines et al. | |
| 7,596,716 B2 | 9/2009 | Frost et al. | |
| 7,653,593 B2 | 1/2010 | Zarikian et al. | |
| 7,668,840 B2 | 2/2010 | Bayliss et al. | |
| 7,672,865 B2 | 3/2010 | Kumar et al. | |
| 7,698,163 B2 | 4/2010 | Reed et al. | |
| 7,707,059 B2 | 4/2010 | Reed et al. | |
| 7,725,300 B2 | 5/2010 | Pinto et al. | |
| 7,742,982 B2 | 6/2010 | Chaudhuri et al. | |
| 7,930,195 B2 * | 4/2011 | Heyns et al. | 705/35 |
| 7,954,698 B1 * | 6/2011 | Pliha | 235/379 |
| 7,983,932 B2 | 7/2011 | Kane | |
| 7,991,689 B1 | 8/2011 | Brunzell et al. | |
| 2001/0037332 A1 | 11/2001 | Miller et al. | |
| 2001/0049620 A1 | 12/2001 | Blasko | |
| 2002/0049968 A1 * | 4/2002 | Wilson et al. | 725/35 |
| 2002/0077964 A1 | 6/2002 | Brody et al. | |
| 2002/0099609 A1 * | 7/2002 | Nascenzi et al. | 705/21 |
| 2002/0099628 A1 | 7/2002 | Takaoka et al. | |
| 2002/0138297 A1 | 9/2002 | Lee | |
| 2002/0173984 A1 | 11/2002 | Robertson et al. | |
| 2002/0184255 A1 | 12/2002 | Edd et al. | |
| 2002/0194103 A1 | 12/2002 | Nabe | |
| 2003/0018549 A1 | 1/2003 | Fei et al. | |
| 2003/0050882 A1 | 3/2003 | Degen et al. | |
| 2003/0083893 A1 | 5/2003 | Aliffi et al. | |
| 2003/0097380 A1 | 5/2003 | Mulhern et al. | |
| 2003/0105728 A1 | 6/2003 | Yano et al. | |
| 2003/0171942 A1 | 9/2003 | Gaito | |
| 2003/0191731 A1 | 10/2003 | Stewart et al. | |
| 2003/0212654 A1 | 11/2003 | Harper et al. | |
| 2003/0229892 A1 | 12/2003 | Sardera | |
| 2004/0122735 A1 | 6/2004 | Meshkin | |
| 2004/0128150 A1 | 7/2004 | Lundegren | |
| 2004/0153448 A1 | 8/2004 | Cheng et al. | |
| 2004/0199789 A1 | 10/2004 | Shaw et al. | |
| 2004/0205157 A1 | 10/2004 | Bibelnieks et al. | |
| 2004/0220896 A1 | 11/2004 | Finlay et al. | |
| 2004/0225596 A1 | 11/2004 | Kemper et al. | |
| 2004/0243588 A1 | 12/2004 | Tanner et al. | |
| 2005/0004805 A1 | 1/2005 | Srinivasan | |
| 2005/0010513 A1 | 1/2005 | Duckworth et al. | |
| 2005/0027633 A1 | 2/2005 | Fortuna et al. | |
| 2005/0154664 A1 | 7/2005 | Guy et al. | |
| 2005/0197954 A1 | 9/2005 | Maitland et al. | |
| 2005/0209922 A1 | 9/2005 | Hofmeister | |
| 2005/0240468 A1 * | 10/2005 | Inman et al. | 705/10 |
| 2005/0288954 A1 | 12/2005 | McCarthy et al. | |
| 2006/0020611 A1 | 1/2006 | Gilbert et al. | |
| 2006/0074991 A1 | 4/2006 | Lussier et al. | |
| 2006/0149674 A1 | 7/2006 | Cook et al. | |
| 2006/0293921 A1 | 12/2006 | McCarthy et al. | |
| 2006/0294199 A1 | 12/2006 | Bertholf | |
| 2007/0011039 A1 | 1/2007 | Oddo | |
| 2007/0226093 A1 | 9/2007 | Chan et al. | |
| 2007/0282730 A1 | 12/2007 | Carpenter et al. | |
| 2008/0059224 A1 | 3/2008 | Schechter | |
| 2008/0120155 A1 | 5/2008 | Pliha | |
| 2008/0301016 A1 | 12/2008 | Durvasula et al. | |
| 2009/0112650 A1 | 4/2009 | Iwane | |
| 2009/0129377 A1 * | 5/2009 | Chamberlain et al. | 370/389 |
| 2009/0132559 A1 * | 5/2009 | Chamberlain et al. | 707/100 |
| 2010/0094758 A1 | 4/2010 | Chamberlain et al. | |
| 2010/0145847 A1 | 6/2010 | Zarikian et al. | |
| 2011/0071950 A1 | 3/2011 | Ivanovic | |
| 2012/0047219 A1 | 2/2012 | Feng et al. | |
| 2012/0095927 A1 | 4/2012 | Hirtenstein et al. | |
| 2012/0158574 A1 | 6/2012 | Brunzell et al. | |
| 2012/0158575 A1 | 6/2012 | Chaudhuri et al. | |

FOREIGN PATENT DOCUMENTS

| | | |
|---|---|---|
| EP | 0 559 358 | 9/1993 |
| EP | 0977128 | 2/2000 |
| EP | 0772836 | 12/2001 |
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |

| | | |
|---|---|---|
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| WO | WO 95/34155 | 12/1995 |
| WO | WO 96/00945 | 1/1996 |
| WO | WO 97/23838 | 7/1997 |
| WO | WO 98/41931 | 9/1998 |
| WO | WO 98/41932 | 9/1998 |
| WO | WO 98/41933 | 9/1998 |
| WO | WO 99/17225 | 4/1999 |
| WO | WO 99/17226 | 4/1999 |
| WO | WO 99/22328 | 5/1999 |
| WO | WO 99/38094 | 7/1999 |
| WO | WO 00/04465 | 1/2000 |
| WO | WO 00/28441 | 5/2000 |
| WO | WO 2010/062537 | 6/2010 |

OTHER PUBLICATIONS

Webber, Richard. The Relative Power of Geodemographics Vis a Vis Person and Household Level Demographics as Discriminators of Consumer Behavior. www.casa.ucl.ac.uk/working_papers/paper84.pdf 2004.*

McManus, John; Fetto, John. Street Wiser. American Demographics; Jul./Aug. 2003; 25, 6; ABI/INFORM Global p. 32.* de Gruchy, Jeanelle; Robinson, Jean. Geodemographic profiling benefits stop-smoking service. The British Journal of Healthcare Computing and Information Management; Feb. 2007; 24, 1; Proquest Health and Medical Complete p. 29.*

Experian and AGS Select SRC to Deliver Complete Marketing Solutions; Partnership First to Marketplace With Census2000 Data. PR Newswire. New York: Mar. 21, 2001. p. 1.*

U.S. Appl. No. 12/705,489, filed Feb. 12, 2010, Bargoli et al.

U.S. Appl. No. 12/705,511, filed Feb. 12, 2010, Bargoli et al.

Bult, Jan Roelf et al., Optimal Selection for Direct Mail, Marketing Science, vol. 14, No. 4 (1995), p. 378-94.

Elmasri et al., "Fundamentals of Database Systems, Third Edition (Excerpts)," Jun. 2000, pp. 253, 261, 268-270, 278-280, 585, 595.

GR Bitran, SV Mondschein—Management Science, 1996—JSTOR Mailing Decisions in the Catalog Sales Industry, Gabriel R. Bitram, Susana V. Mondschein. Management Sciencem vol. 42, No. 9, 1364-81, Sep. 1996.

Haughton, Dominique et al., Direct Marketing Modeling with CART and CHAID, Journal of Direct Marketing, vol. 11, Iss. 4, 1997, p. 42-52.

Klein, "A Constant-Utility Index of the Cost of Living", The Review of Economic Studies, 1960, pp. 84-87, vol. XV-XVI, Kraus Reprint Corporation, New York.

Klein, L.R. & Goldberger, A.S. (1955) An Econometric Model of the United States: 1929-1952, Amsterdam: North-Holland.

Klein, L.R. (1946) The Keynesian Revolution, New York: MacMillan.

Schmittlein, David C. et al., Customer Base Analysis: An Industrial Purchase Process Application, Marketing Science, vol. 13, No. 1 (Winter 1994), p. 41-67.

Service Objects: Insight on Demand, Instant Contact Analysis and Lead Verification Solutions, DOTS Web Services—Product Directory, downloaded from www.serviceobjects.com/products/directory_of_web_services.asp, printed Mar. 8, 2011 in 3 pages.

Smith, Wendell R., "Product Differentiation and Market Segmentation as Alternative Marketing Strategies", The Journal of Marketing, Jul. 1956, pp. 3-8, vol. XXI, The American Marketing Association, Brattleboro, Vermont, U.S.A.

Stone, "Linear Expenditure Systems and Demand Analysis: An Application to the Pattern of British Demand", The Economic Journal: The Journal of the Royal Economic Society, 1954, pp. 511-527, vol. LXIV, Macmillan & Co., London.

Working, Holbrook, "Statistical Laws of Family Expenditure", Journal of the American Statistical Association, 1943, pp. 43-56, vol. 38, American Statistical Association, Washington, D.C.

Experian: Improve Outcomes Through Applied Customer Insight, Brochure, Nov. 2009, p. 20.

Experian: Mosaic Geodemographic Lifestyle Segmentation on ConsumerView [Data Card], as printed from http://datacards.experian.com/market?page=research/datacard_print&prin, Apr. 6, 2012, p. 4.

Experian: Mosaic Public Sector 2009 Launch, Nov. 27, 2009, p. 164.

Experian: Mosaic United Kingdom, Brochure, Jun. 2009, p. 24.

Experian: Mosaic UK-Optimise the Value of Your Customers and Locations, Now and in the Future, Brochure, Jun. 2012, p. 24.

Experian: Mosaic UK—Unique Consumer Classification Based on In-Depth Demographic Data, as printed from http://www.experian.co.uk/business-strategies/mosaic-uk.html, Jul. 30, 2012, p. 2.

Experian: Mosaic USA, Brochure, May 2009, p. 14.

Experian: Mosaic USA-Consumer Lifestyle Segmentation [Data Card], Dec. 2009, p. 2.

Experian: Public Sector, as printed form http://publicsector.experian.co.uk/Products/Mosaicpublicsector.aspx, 2009, p. 2.

"Mosaic" (geodemography), available from http://en.wikipedia.org/wiki/Mosaic (geodemography), as last modified Jul. 13, 2012. p. 4.

"Intelligent Miner Web Applications Guide"; Chapters 4-7; pp. 33-132; IBM Corp., Apr. 2, 1999.

"Japan's JAAI system appraises used cars over internet", Asia Pulse, Mar. 3, 2000.

"WashingtonPost.com and Cars.com launch comprehensive automotive web site for the Washington area". PR Newswire, Oct. 22, 1998.

Caliendo, et al., "Some Practical Guidance for the Implementation of Propensity Score Matching"; IZA:Discussion Paper Series; No. 1588; Germany; May 2005.

Miller, Joe, "NADA used-car prices go online". Automotive News, Jun. 14, 1999, p. 36.

Sawyers, Arlena "NADA to offer residual guide". Automotive News, May 22, 2000, p. 3.

Tao, Lixin, "Shifting Paradigms with the Application Service Provider Model"; Concordia University, Canada; IEEE; Oct. 2001.

Thoemmes, Felix, "Propensity Score Matching in SPSS", Center for Educational Science and Psychology, University of Tübingen, Jan. 2012.

Various Posts from the <p2p.wrox.com> Forums: http://web.archive.org/web/2005045221950/http://p2p,wrox.com/topic.asp?TOPIC_ID=6513, dated Nov. 15, 2003-Oct. 7, 2004.

Web Page posted at: http: //web.archive.org/web20040805124909/http://www.oracle.com/technology/sample_/ codete/tech/pl_sql/htdocs/x/Case/start.htm, pp. 1 and 4 of the webs page posted on Jan. 7, 2003.

International Search Report and Written Opinion for Application No. PCT/US09/60393, dated Dec. 23, 2009.

* cited by examiner

SYSTEMS AND METHODS FOR FORECASTING HOUSEHOLD ECONOMICS

CROSS-REFERENCE TO RELATED APPLICATIONS

This application is a continuation of U.S. patent application Ser. No. 12/831,946 filed on Jul. 7, 2010, which claims priority to U.S. Provisional Patent Application No. 61/223,978, filed Jul. 8, 2009, and entitled "Incorporating Macroeconomic Forecast Information Within Geodemographic Household Classification Systems," both of which are hereby incorporated by reference as if set forth herein in its entirety.

BACKGROUND

The invention relates to the field of econometric analysis. Specifically, it relates to forecasting household economics based on macroeconomic data.

Predictions of household economics have a wide range of uses. Such predictions can indicate the likely sources of income for households and income amounts, likely expenditures and products and services purchased, amounts saved per household, and other similar information. This data can be used by advertisers seeking to target advertisements to households of interest, by government policy makers seeking to determine the effect of legislative and regulatory changes, by investors seeking to determine the risk of an investment, and so on.

Techniques for predicting macroeconomic changes, such as GDP, employment rates, interest rates, and the like, are well-known in the economic literature. However, these macroeconomic variables provide only a high-level analysis, without differentiating among different types of households. These macroeconomic models, then, are not able to provide the fine-grained analysis that may be required for decision-making in many circumstances.

SUMMARY

Various aspects of the invention are directed to systems and methods for forecasting household economics. One aspect of the invention is a method of forecasting household economic data based on a macroeconomic scenario. In this aspect, a storage media of a computer maintains household survey records, and geodemographic segment identifiers are added to those records. A computer processor is used to aggregate the household survey records by geodemographic segments. The resulting segment-level records can be applied to an econometric model, and the model can use macroeconomic forecast assumptions related to the macroeconomic scenario, thus producing economic forecasts for the geodemographic segments. The economic forecasts that are produced may include predicted income and expenditures for each of the geodemographic segments.

DETAILED DESCRIPTION

In one embodiment, the system described herein runs on one or more computing devices. Moreover, in some embodiments, the features of the system are available via a fully-hosted application service provider that manages and provides access to the system, for example, via a web interface or other interface. In other embodiments, the system may be available via partially hosted ASPs or other providers. In additional embodiments, the system may be accessed through a broad assortment of interface channels, including XML, fixed format data inquiry, batch or a comprehensive and easy-to-use web browser user interface. In yet further embodiments, the system may be a customer-side installed solution and may be included and/or in direct communication with one or more third party systems.

In general, the words "module," "function," and similar terms, as used herein, refer to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the computing devices include and/or communicate with a database module or data source. The database module or data source may be implemented using one or more databases, such as a relational database, such as Sybase, Oracle, CodeBase and Microsoft® SQL Server as well as other types of databases, such as, for example, a flat file database, an entity-relationship database, and object-oriented database, and/or a record-based database. The database may be operated on the same computing device or devices as other modules, or they may be operated on different computing devices. In some embodiments, some or all of the databases are operated by an entity different from the entity operating the analysis. The databases may be operated by an independent service provider.

In one embodiment, each of the computing devices are IBM, Macintosh, or Linux/Unix compatible. In another embodiment, the computing devices comprise a server, a laptop computer, a cell phone, a personal digital assistant, a kiosk, an interactive voice response device, a voice response unit, or an audio player, for example. In one embodiment, the computing devices include one or more CPUs, which may each include microprocessors. The computing devices may further include one or more memory devices, such as random access memory (RAM) for temporary storage of information and read only memory (ROM) for permanent storage of information, and one or more mass storage devices, such as hard drives, diskettes, or optical media storage devices. In one embodiment, the modules of the computing are in communication via a standards based bus system, such as bus systems using Peripheral Component Interconnect (PCI), Microchannel, SCSI, Industrial Standard Architecture (ISA) and Extended ISA (EISA) architectures, for example. In some embodiments, components of the computing devices communicate via a network, such as a local area network that may be secured.

The computing devices are generally controlled and coordinated by operating system software, such as the Windows 95, Windows 98, Windows NT, Windows 2000, Windows XP, Windows Vista, Linux, SunOS, Solaris, PalmOS, Blackberry OS, or other compatible operating systems. In Macintosh systems, the operating system may be any available operating system, such as MAC OS X. In other embodiments, the computing devices may be controlled by a proprietary operating system. Conventional operating systems control and schedule computer processes for execution, perform memory management, provide file system, networking, and I/O services, and provide a user interface, such as a graphical user interface ("GUI"), among other things.

The computing devices may include one or more commonly available input/output (I/O) devices and interfaces, such as a keyboard, mouse, touchpad, microphone, and printer. Thus, in one embodiment the computing devices may be controlled using the keyboard and mouse input devices, while in another embodiment the user may provide voice commands to the computing devices via a microphone. In one embodiment, the I/O devices and interfaces include one or more display device, such as a monitor, that allows the visual presentation of data to a user. More particularly, a display device provides for the presentation of GUIs, application software data, and multimedia presentations, for example. The computing devices may also include one or more multimedia devices, such as speakers, video cards, graphics accelerators, and microphones, for example.

In one embodiment, the I/O devices and interfaces provide a communication interface to various external devices and the communications medium via wired or wireless communication links. For example, the computing devices may be configured to communicate with the communications medium using any combination of one or more networks, LANs, WANs, or the Internet, for example, via a wired, wireless, or combination of wired and wireless communication links.

Figure 1:
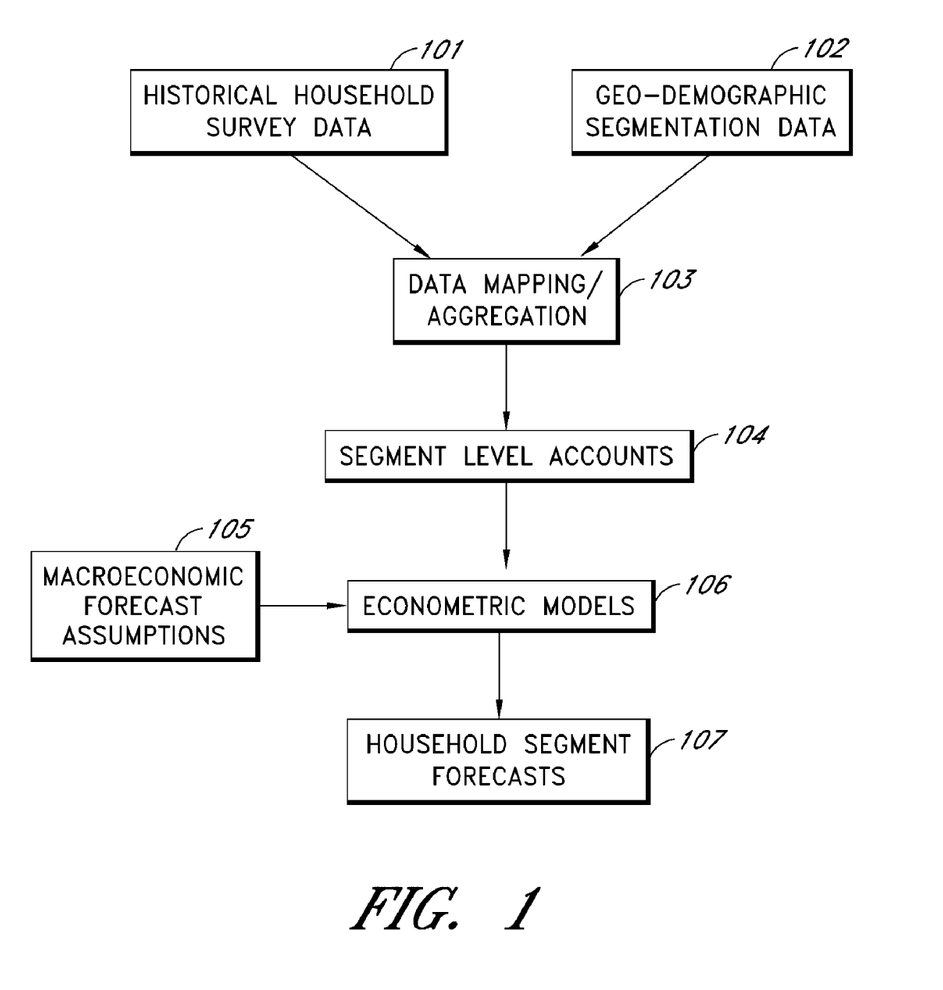
FIG. 1 is a flow diagram outlining a method of forecasting segment-level data, used in an embodiment of the invention.

In one embodiment of the invention, the steps depicted in FIG. 1 are performed. Household survey data are collected at step 101. Survey data may include a variety of information collected about households by any means, including statistical sampling, census data, mailed surveys, data collected by private organizations such as banks or merchants, and so on. In an embodiment, the household survey data includes at least three broad categories: gross household income, deductions from gross household income, and household expenditures. Gross household income may include wages and salaries, self-employment income, investment income, annuities and pensions, social security or other governmental benefits, and other sources of income. Deductions from gross household income may include income taxes, social security taxes, and other taxes, as well as costs such as mortgage or loan payments. Deductions from gross household income may alternatively be characterized as household expenditures. Household expenditures include amounts spent by households out of disposable income. In one embodiment, expenditure categories are based on the Classification of Individual Consumption According to Purpose (COICOP), published by the United Nations Statistics Division, which is hereby incorporated by reference. It is contemplated that other categories of data may be included, or some categories of data will not be included, in the household survey data. Additionally, in some embodiments, the data is separated by individual categories, so as to allow for particularized analysis in further steps. In one embodiment, each record in the household survey data may represent a single household, or a group of households. Other data structures or representations of household survey data may be alternatively used.

At step 102, geodemographic segmentation data is collected. Geodemographic segmentation data provides information about "segments," or groups of geographical areas that tend to have certain similarities, on the basis that people who live in the same neighborhood are likely to share a number of characteristics and behaviors. The geodemographic segmentation data may indicate characteristics of geographical areas, such as by ZIP code, voting district, state, city, county, or other units. The data may incorporate information on the financial resources and spending behavior of household segments. The data may include quantitative estimates of the economic resources available to household segments from income and accumulated wealth, as well as the spending patterns of those household segments. Such estimates may be based on historical information, survey data, statistical sampling, census data, privately collected data, or other data sources. In one embodiment, Experian's MOSAIC™ and PIXEL™ data are included in the geodemographic segmentation data.

At step 103, a data mapping and aggregation function is applied to the household survey data and the geodemographic segmentation data. The mapping function may associate the data sets based on a common join variable, such as ZIP codes or other address codes. A join variable, as understood by those of skill in the art, is a data field present in multiple data sets that may be used to identify and join matching records in the data set to create an augmented data set. So, for example, a record in the household survey data having a particular ZIP code may be matched with a record in the geographic segmentation data having the same ZIP code. Those of skill in the art will be familiar with other methods of identifying matching records among multiple data sets, such as fuzzy matching, lookup tables, statistical correlation techniques, and so forth. Detailed implementations of embodiments of the data mapping and aggregation function are described throughout this specification, such as with regard to FIGS. 2-4.

The data mapping and aggregation function produces a data set of segment-level household accounts, indicated in step 104. This data set may incorporate parts or all of the household survey data and parts or all of the geodemographic segmentation data.

At step 105, a set of macroeconomic forecast assumptions is gathered, and the forecast assumptions and segment-level accounts are provided as inputs to one or more econometric models in step 106. The macroeconomic forecast assumptions include data representing macroeconomic variables relating to a certain macroeconomic scenario. This may include, for example, gross domestic product, employment rates, unemployment rates, household income statistics, income growth rates, interest rates, consumer product indexes, inflation indexes, product prices, asset prices, total household expenditures, or other values. When the econometric models are applied in step 106, they produce household segment forecasts at step 107. These forecasts may include forecasts of household incomes and expenditures, and they may include particular forecasts of particular income sources and expenditure types. The process of applying macroeconomic models is explained in further detail throughout this specification, such as with regard to FIGS. 5-6.

The econometric models may be generated at step 106 or elsewhere based on historical data from the household accounts or other data. In an embodiment, a statistical analysis is conducted of historical relationships between macroeconomic variables, such as the ones above, and household finances within the geodemographic segments. This analysis may be done, for example, using time-series analysis or panel estimation techniques, or with other well-known statistical methods. The resulting relationships are then used to predict future household financial circumstances and spending behavior for the geodemographic segments. The historical information on household financial resources and expenditure patterns may be compiled based on a household classification scheme defined by income, location, household structure, or other means, rather than a geodemographic segmentation scheme. In this case, the statistical analysis produces relationships between household financial circumstances and spending behavior for household types within this alternative classification, and these relationships are then mapped to geodemographic segments based on characteristics of the geodemographic segments and the alternative household classification.

Figure 2:
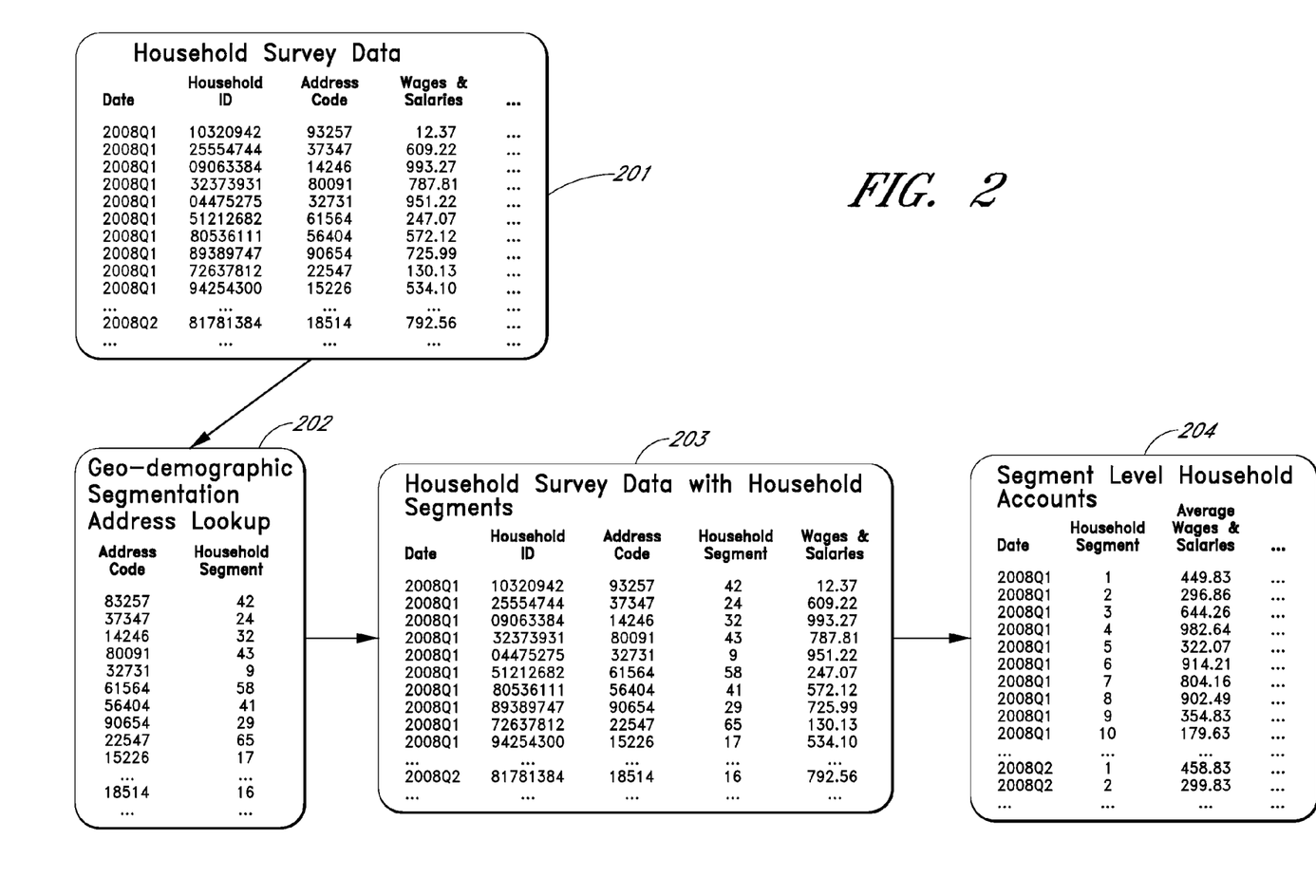
FIG. 2 presents a possible data mapping and aggregation function used in an embodiment of the invention.

FIG. 2 illustrates a data mapping and aggregation function of one embodiment of the invention. In this embodiment, household survey data 201 (such as that of 101) includes an address code field, such as a ZIP code, and a date range field, among other data fields. The date range field, in this embodiment, indicates a time or time period to which the survey record is relevant. For example, the date range field may indicate the date when the survey was taken, a range of dates between which data was collected, etc.

A geodemographic segmentation address lookup 202 includes a mapping between address codes and household segment identifiers. Thus, the geodemographic segmentation address lookup can be used to determine the pertinent geodemographic segment for a given address code.

Ordinarily, the household survey data 201 and geodemographic segmentation address lookup 202 are sufficiently large to produce statistically significant results when the analyses described here are performed, so the data sets are joined, using a computer processor, based on the respective address code fields of the data sets, so that the household survey data 201 is augmented with a household segment field to produce an augmented data set 203.

Next, the data records are aggregated by household segment and date range, to produce a data set 204 with individual records for each unique household segment and date range. The aggregation of data fields may be done by calculating the mean, median, mode, sum, or other aggregate value of each data field, for all data records having the same date range and household segment. For example, to aggregate the "Wages and Salaries" field, the wages and salaries of each household in a given segment for a given date range may be averaged, to produce an average wages and salaries Numerous aggregation functions are well known in the art. In one embodiment, the aggregation is performed in part by performing, in a relational database, a specialized SELECT statement in the SQL language, including a JOIN and a GROUP BY clause. Other methods of performing the above steps will be well known to those of ordinary skill in the art.

Figure 3:
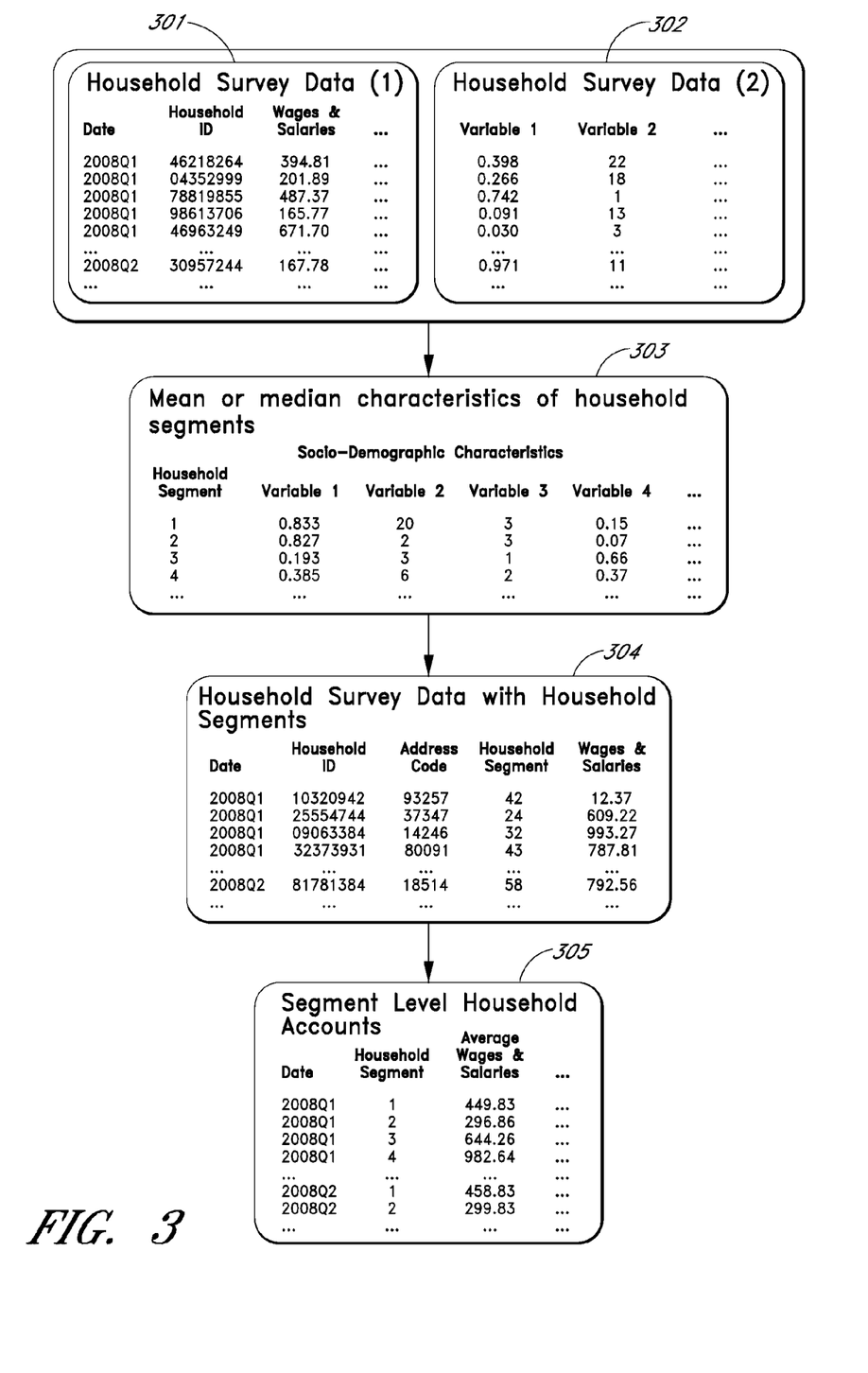
FIG. 3 presents another possible data mapping and aggregation function used in an embodiment of the invention.

Another embodiment of a data mapping and aggregation function is provided in FIG. 3. In this embodiment, a first household survey data set 301 may lack an address code field. A second data set 302 includes socio-demographic and location characteristics of various households or groups of households, and includes a household segment field. The second data set is aggregated by household segment to produce average characteristics of household segments 303. Alternatively, the second data set 302 may be data already aggregated by household segments, so the aggregation step is not necessary. Next, the characteristics of the household survey data 301 are compared to the aggregated values of step 303, so that each household record may be augmented with a household segment to produce data set 304. The records of the new data set 304 are aggregated, as above, by household segment and date range, to produce a data set 305 with individual records for each unique household segment and date range.

Figure 4:
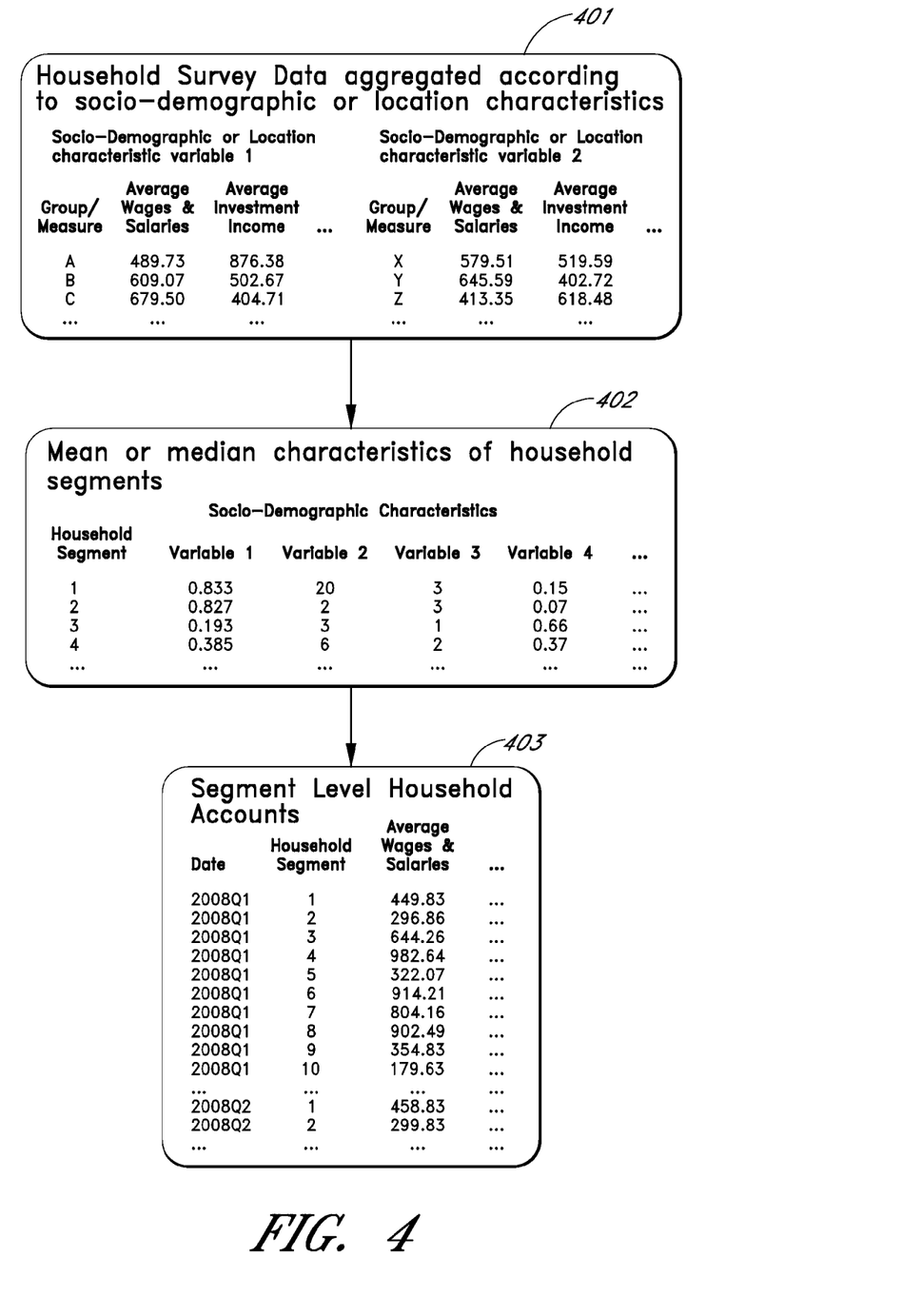
FIG. 4 presents another possible data mapping and aggregation function used in an embodiment of the invention.

Another embodiment of a data mapping and aggregation function is provided in FIG. 4. In this embodiment, household survey data 401 is already aggregated by some sociodemographic, location, or other characteristics into groups. This may be the case, for example, when micro-level data, or survey data individual to single households, is not available, or the data provider has previously aggregated the data. Average characteristics of household segments 402 include average or otherwise aggregated socio-demographic, location, or other characteristics for individual household segments. By matching the characteristics of the groups of the household survey data 401 with the average characteristics 402, it is possible to produce a data set with individual records for each unique household segment and date range 403. For example, if a particular household segment S is characterized by having certain values for a variable X, then it can be inferred that this household segment is similar to household survey data records R having similar values for the same variable X. Thus, one way to determine the value of a second variable Y for the household segment S would be to estimate it based on the corresponding Y values for the matching household survey data records R. This estimation may be done with standard statistical techniques, such as linear regression, neural networks, automated simulations, or the like.

Figure 5:
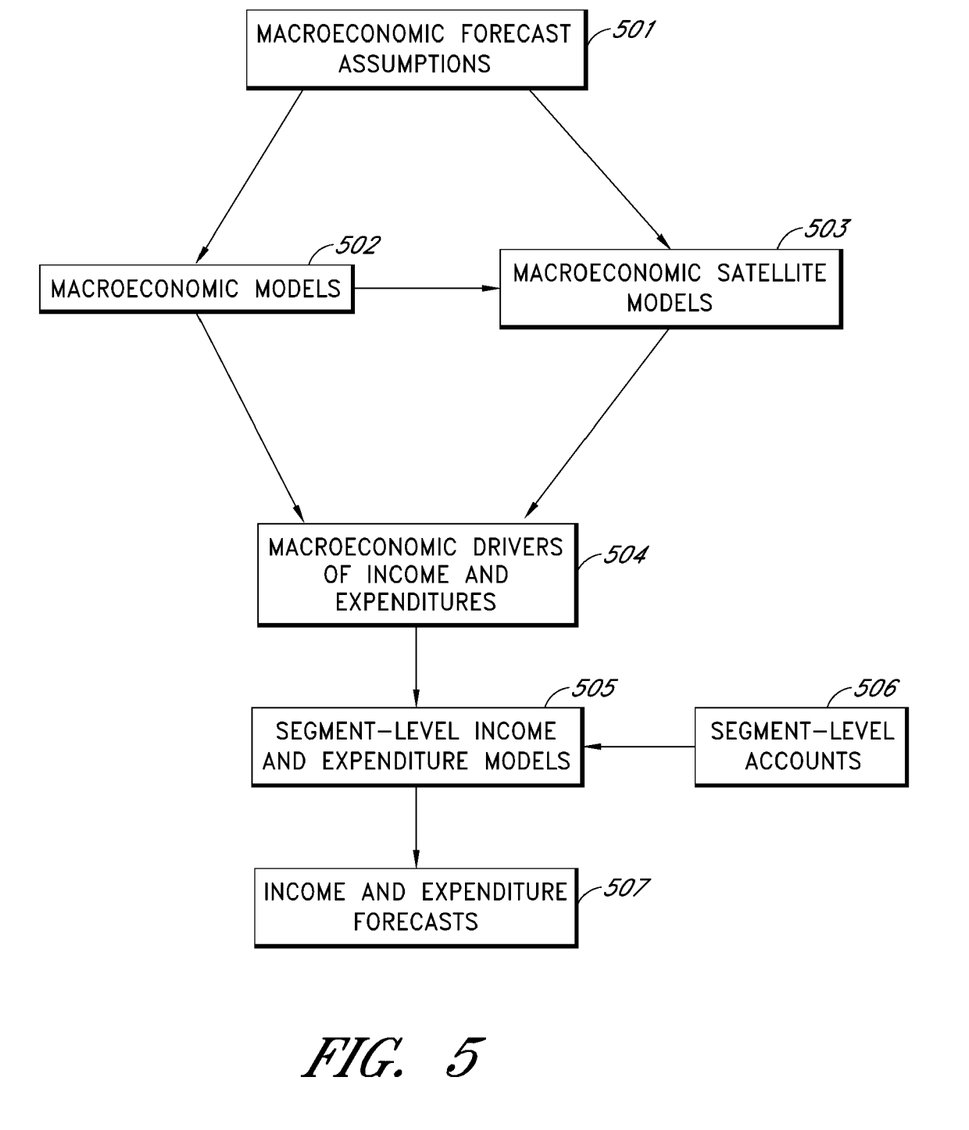
FIG. 5 is a flow diagram showing a method of applying econometric models to produce income and expenditure forecasts used in an embodiment of the invention.

FIG. 5 depicts a process for applying macroeconomic forecast assumptions to segment-level account data to produce segment-level income and expenditure forecasts, as used in one embodiment of the invention. Macroeconomic forecast assumptions 501, as described previously, are provided as inputs to macroeconomic models 502. Macroeconomic models 502 convert macroeconomic forecast assumptions 501 into forecasts for key macroeconomic variables via a set of equations describing relationships between variables, typically estimated on the basis of historical data. Many such models are well known, and they typically generate forecasts for aggregate variables related to total output and income, employment and unemployment, household incomes, financial variables such as interest rates, prices, and other variables described throughout this specification or otherwise well known.

Additionally, the forecast assumptions 501 and/or outputs of the macroeconomic models can be applied to macroeconomic satellite models 503. These satellite models provide additional detail related to household finances and can be used to create more detailed macroeconomic forecasts to drive segment level forecasts. Values modeled by the satellite models 503 may include output, employment and/or unemployment for individual industries, regions, occupations, socio-demographic groups, locations, etc. They may also model household income by income source type, interest rates by type of debt, detailed price deflators for individual products, prices by types of assets, household expenditures by product types, household assets and debts, and so on.

In an embodiment, the output of the macroeconomic models 502 and satellite models 503 is a set of macroeconomic drivers of income and expenditures 504. These macroeconomic drivers may include general macroeconomic values and detailed values related to household finances, such as employment, household income by source, assets and debts, interest rates, inflation, expenditure by type, and so on. The macroeconomic drivers are provided as inputs to segment-level income and expenditure models 505, along with the segment-level account data 506 calculated as described elsewhere in this specification, such as with regard to step 104 of FIG. 1. The segment-level models, then, are applied to produce income and expenditure forecasts 507 for individual geodemographic segments.

TABLE 1

Impact of Interest Rate Increases Since Mid-2006

| Segment | Disposable Incomes | Total Spending | Spending on Food |
|---|---|---|---|
| A01 Global Connections | 0.76 | 0.32 | 0.21 |
| A02 Cultural Leadership | 0.38 | 0.23 | 0.15 |
| A03 Corporate Chieftains | 1.16 | 1.00 | 0.64 |
| A04 Golden Empty Nesters | 0.81 | 0.66 | 0.42 |
| A0S Provincial Privilege | 0.96 | 0.81 | 0.52 |
| B08 Just Moving In | −0.38 | −0.53 | −0.34 |
| B09 Fledgling Nurseries | −0.17 | −0.32 | −0.21 |
| B10 Upscale New Owners | 0.36 | 0.21 | 0.13 |
| B11 Families Making Good | −0.02 | −0.18 | −0.11 |
| B14 In Military Quarters | −1.10 | −1.25 | −0.80 |
| C15 Close to Retirement | 0.75 | 0.60 | 0.38 |
| C16 Conservative Values | 0.52 | 0.37 | 0.24 |
| E33 Town Gown Transition | 0.15 | −0.01 | 0.00 |
| E34 University Challenge | −0.51 | −0.67 | −0.43 |
| F35 Bedsit Beneficiaries | −0.25 | −0.41 | −0.26 |
| F38 Tower Block Living | −0.57 | −0.72 | −0.46 |
| F39 Dignified Dependency | −0.72 | −0.87 | −0.56 |
| F40 Sharing a Staircase | −0.48 | −0.63 | −0.41 |
| G41 Families on Benefits | −0.80 | −0.95 | −0.61 |
| G42 Low Horizons | −0.39 | −0.55 | −0.35 |
| G43 Ex-industrial Legacy | −0.27 | −0.42 | −0.27 |
| H44 Rustbelt Resilience | −0.12 | −0.27 | −0.17 |
| H45 Older Right to Buy | −0.19 | −0.35 | −0.22 |
| H46 White Van Culture | −0.45 | −0.60 | −0.39 |
| H47 New Town Materialism | −0.50 | −0.65 | −0.42 |

Table 1 shows a sample use of a forecast calculated by an embodiment of the invention. In the "Segment" column, each geodemographic household segment is listed. The three columns "Disposable Incomes," "Total Spending," and "Spending on Food" indicate the percentage difference between actual macroeconomic data, where interest rates increased in the later part of 2006, and forecasted macroeconomic data, with the macroeconomic assumption that interest rates did not increase in the later part of 2006. As this table shows, an individual forecast is calculated for each of the geodemographic household segments.

Figure 6:
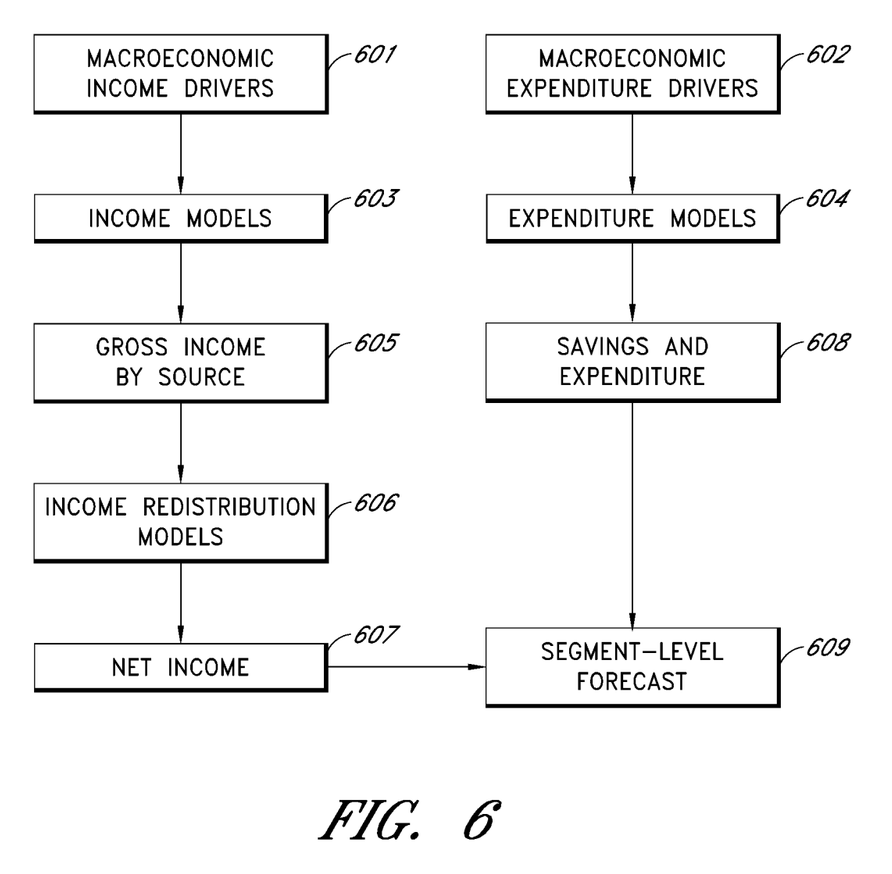
FIG. 6 is a flow diagram showing a method of predicting income and expenses, used in an embodiment of the invention.

An embodiment of a process for using macroeconomic drivers and segment-level models to produce segment-level forecasts is shown in FIG. 6. This process may be used, for example, at steps 504 through 507 of FIG. 5. Macroeconomic income drivers 601 and macroeconomic expenditure drivers 602 are received, for example, from calculations such as those described elsewhere in this specification, such as with regard to FIG. 5. Two types of segment-level models are used in one embodiment: income models 603 and expenditure models 604. In other embodiments, additional or different models may be applied. The segment-level models may include mathematical equations and identities that may be parameterized in a variety of ways, including the user of time series models, panel econometric estimation techniques, linear regression, nonlinear regression, recursive partitioning, neural networks, or other techniques of multivariate analysis.

The methods of creation and application of the various econometric models are standard statistical and mathematical techniques known to those of ordinary skill in the art. The particular method will depend on the nature of the model created. For example, in an embodiment, the econometric models may include linear regression coefficients. In this embodiment, the segment-level accounts are used as sample data to calculate the linear regression coefficients, thus creating the models. The macroeconomic forecast assumptions may include numerical values that serve as independent variables to the linear regression, and the predicted values of the dependent variables serve as the forecasts of household incomes and expenditures. In other embodiments employing different statistical models, the appropriate well-known techniques for generating and applying the models are used.

In an embodiment, the income models 603 include models for household income by income source. Income sources may include wages and salaries, profits from investments, property incomes, financial transfers, annuities and pensions, and other income sources, such as those listed for step 101 of FIG. 1. The income models may model income for each source individually, or they may aggregate some or all of the sources. The expenditure models 604 may include models for total expenditure and savings for a household, expenditures by individual products or product types, or other similar models. Product types may be separated into categories using the COICOP classifications described previously, or by other systems.

At step 605, the income models 603 are used to forecast the gross income for a household by income source, for the geodemographic household segments, by applying the appropriate mathematical equations and identities described above. The gross income values are then used as inputs to one or more income redistribution models 606. These models may account for income taxation and other forms of taxation, as well as other fixed costs such as mortgages, loans, and other costs. Applying the income redistribution models produces forecasted net income by geodemographic household segment 607. The forecasted gross income and net income may be aggregated and/or separated by income types.

At step 608, the expenditure models are used to forecast household savings and expenditures. These forecasts may be grouped by geodemographic household segments, expenditure types, savings types, and combinations of any of these. Combining the forecasted savings and expenditures 608 with the forecasted net income 607 produces a segment-level forecast 609 that may include information about total spending, saving, spending by product, total income, income by source, and other such information.

Figure 7:
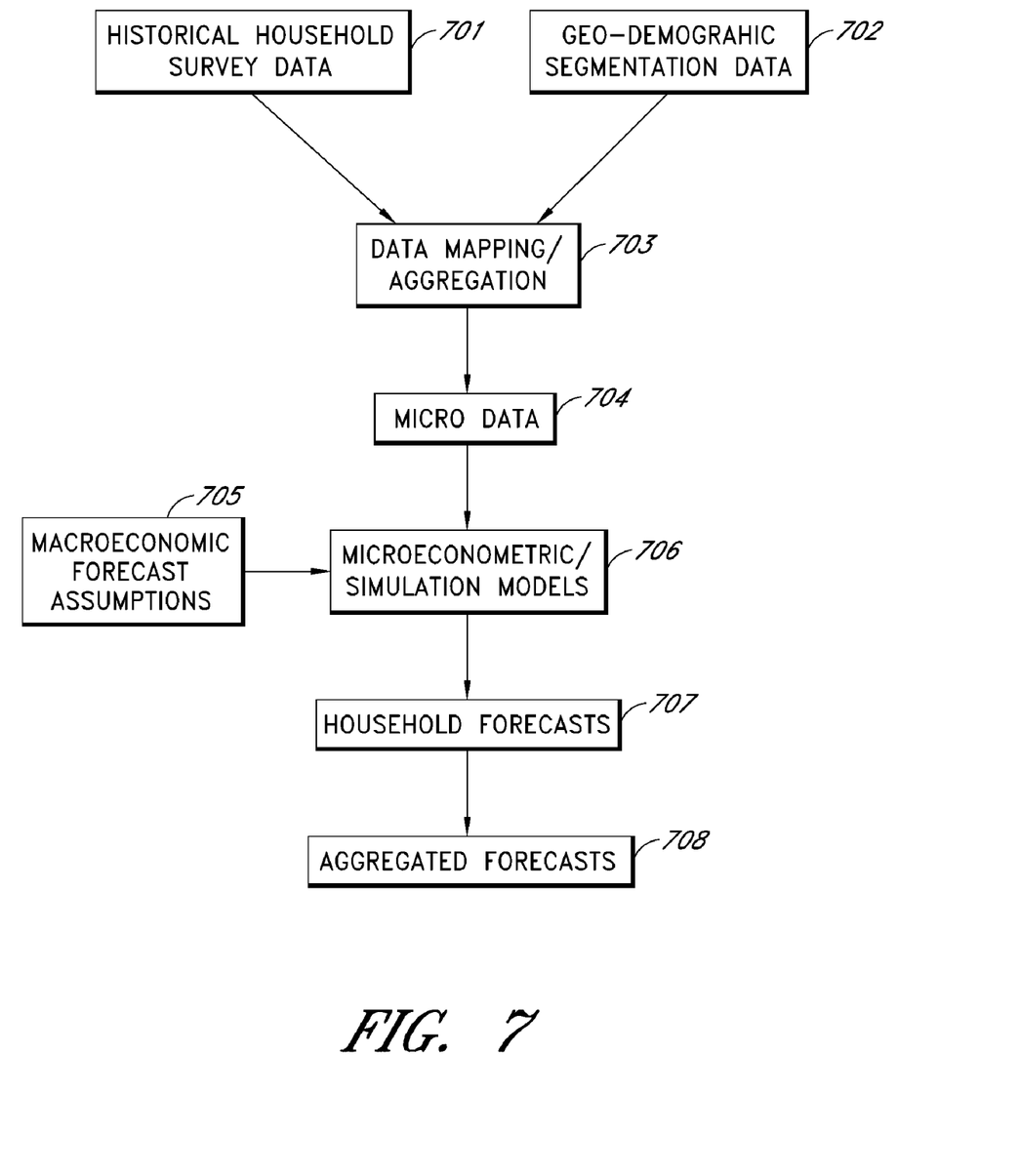
FIG. 7 is a flow diagram outlining another method of forecasting segment-level data, used in an embodiment of the invention.

In another embodiment, segment-level forecasts, as shown in steps 504 through 507 of FIG. 5, may be determined using a process shown in FIG. 7. Household survey data 701 and geodemographic segmentation data 702, such as that described with reference to FIG. 1, are initially collected. In step 703, a data mapping and aggregation function is applied to produce micro data 704, which is household-level data augmented with geodemographic segments but not aggregated by the segments. Macroeconomic forecast assumptions 705, also described with reference to FIG. 1, are used with the micro data as inputs to one or more microeconometric or simulation models at the household level 706. These models are used to predict income, expenditure or other variables for individual households driven by macroeconomic forecast assumptions 705. The models may be generated using methods and historical data as described with regard to FIG. 1. Application of the models produces forecasts for individual households 707. The household-level forecasts can then be aggregated by geodemographic segments in step 708 to produce forecasts aggregated by geodemographic household segments.

Figure 8:
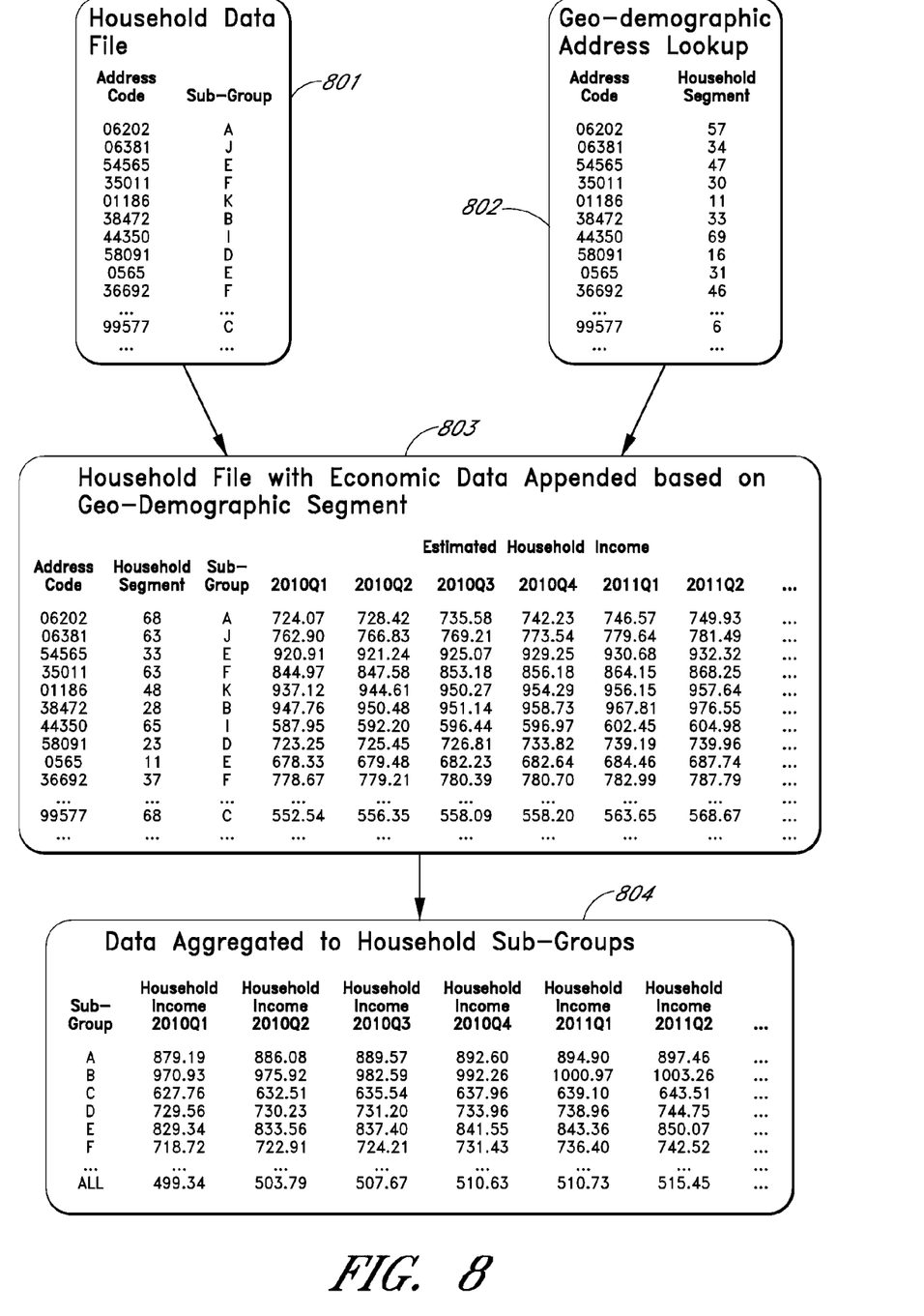
FIG. 8 presents a method of forecasting economic data for household subgroups, used in an embodiment of the invention.

In one embodiment, the economic forecasts by geodemographic household segments are used to provide further information about populations, samples, and subgroups, as shown in FIG. 8. In this embodiment, the output of interest is not forecasts for each of the household segments, but rather forecasts for various subgroups of people that do not necessarily correspond to the household segments. Subgroups may be geographically defined (e.g., cities, school district zones, water districts, etc.) or they may be defined by other characteristics (e.g. family size, household type, education status, etc.). Thus, the outputs of processes described with regard to FIGS. 1 and 7, among others, may be used as inputs in the following embodiment, to make predictions about the subgroups.

A household data file 801 with records for individual addresses mapped to subgroups is used as an input. Using a geodemographic address lookup table 802, the household data file can be augmented with geodemographic household segments, by methods such as those described with reference to FIGS. 2-4, for example. Further augmenting the household data file with economic forecasts for each geodemographic household segment produces a household file 803 with economic forecast data (shown in the last six columns of 803). This data can now be aggregated by the subgroups to produce subgroup-level economic forecast data 804. Depending on the nature of the subgroups, the resulting aggregated data file may have many uses, including, for example, generating estimates and forecasts for customer groups, analyzing alternative household segmentations, determining effects of macroeconomic policies on particular groups of interest, and so on.

Figure 9:
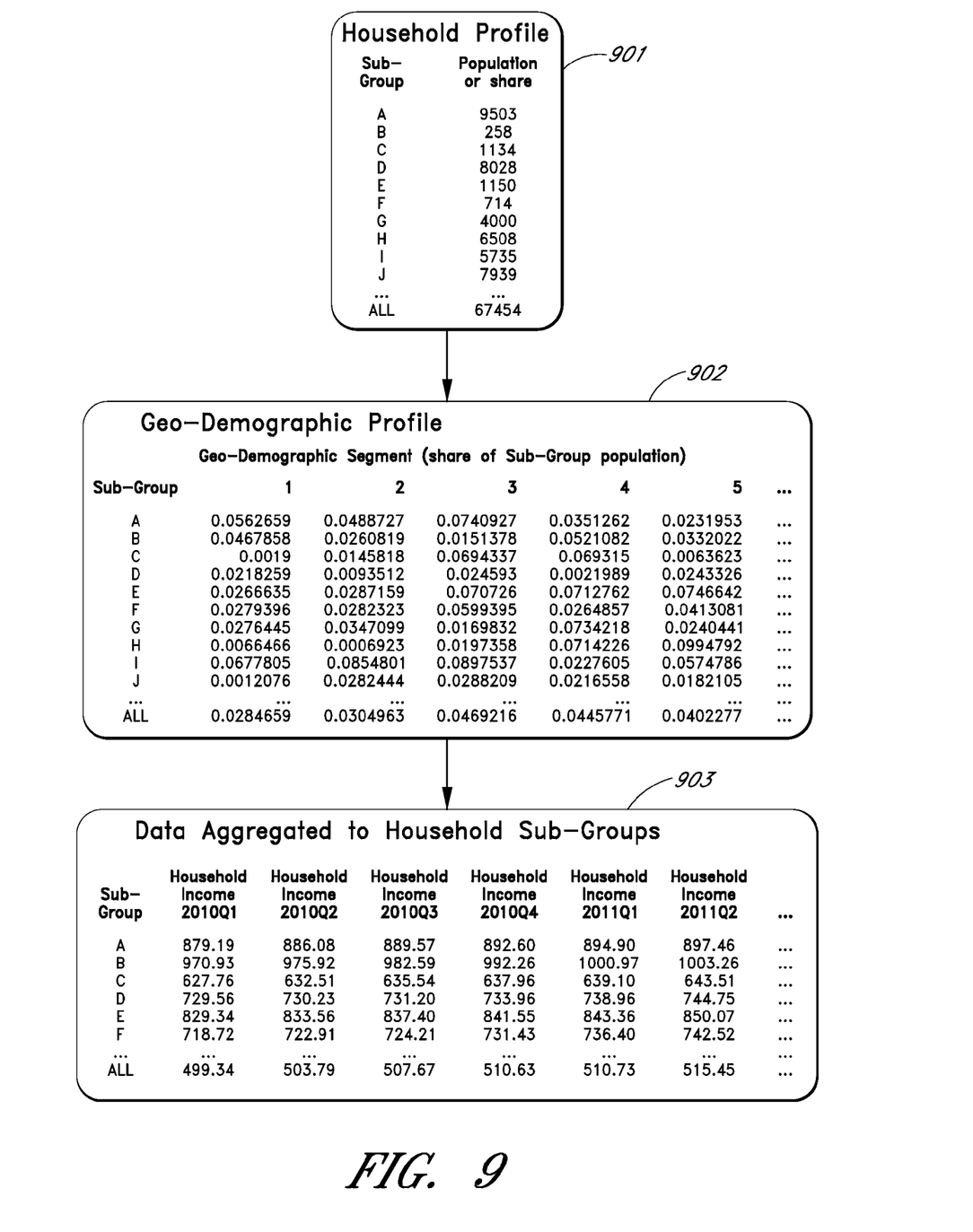
FIG. 9 presents another method of forecasting economic data for household subgroups, used in an embodiment of the invention.

An alternate method of determining economic forecasts for different subgroups is shown in FIG. 9. A household profile 901 is received, indicating a number of subgroups of households. The profile is combined with a geodemographic profile 902 that includes information about the fraction of each subgroup corresponding to each of the geodemographic segments. After calculating the economic forecasts for each geodemographic segment, it is possible to obtain economic forecasts for each of the household subgroups 901 by, for example, calculating a weighted average of the economic forecast values with the weights being the fractions included in the geodemographic profile 902. Thus, by this method, it is possible as well to produce economic forecasts for each subgroup. It is also possible to calculate an economic forecast for a particular group of households, using methods similar to the ones described above.

Figure 10:
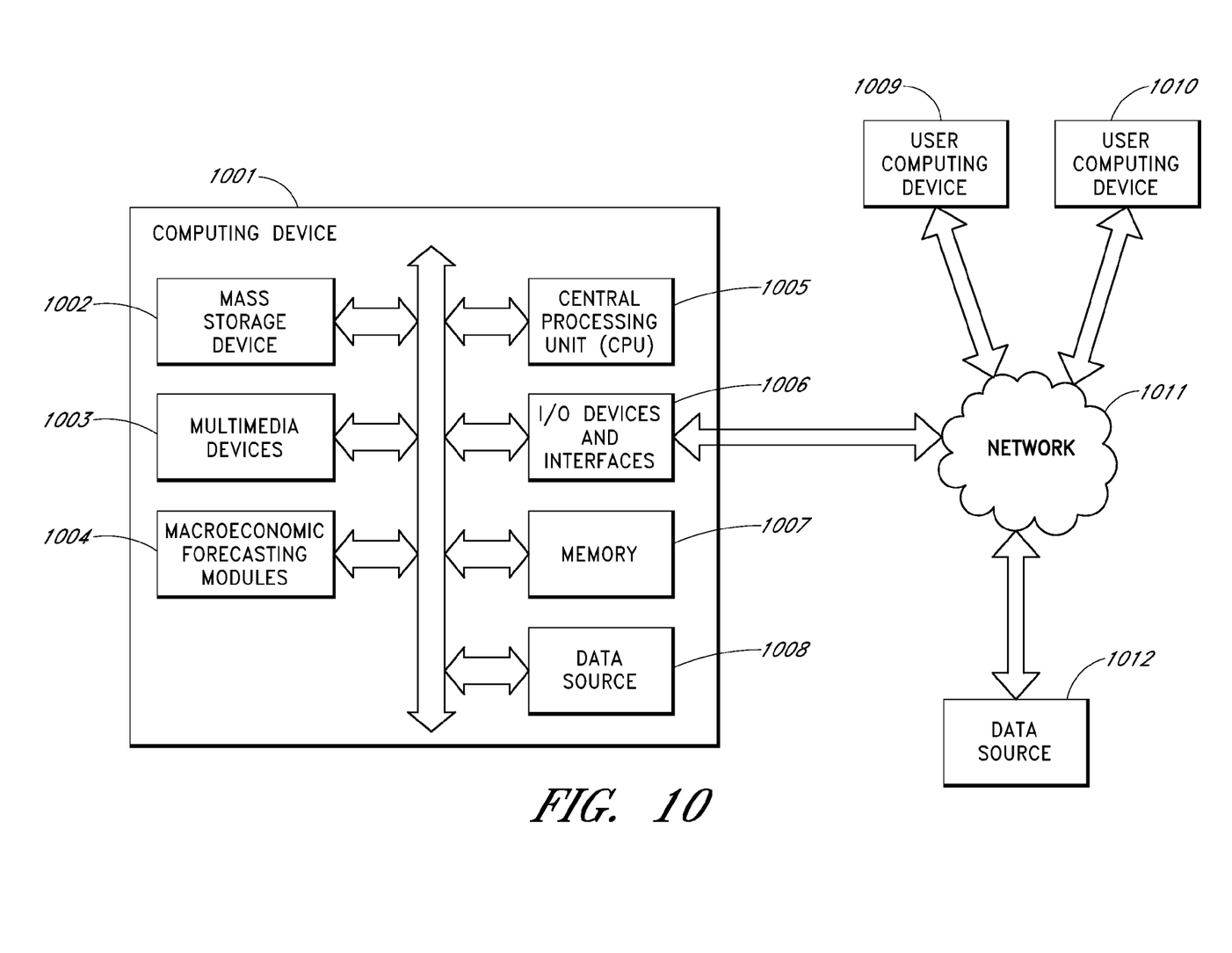
FIG. 10 depicts an exemplary computer hardware system used to implement an embodiment of the invention.

FIG. 10 shows a computer system used in an embodiment of the invention. Computing device 1001 may include, among other things, a mass storage device 1002, multimedia devices 1003, a central processing unit made up of one or more processors 1005, various input/output interfaces and devices 1006, volatile and/or nonvolatile memory 1007, and various data sources 1008. Various embodiments of the invention may include a subset of these components as necessary to implement the methods described above. Furthermore, the computing device 1001 may be connected via a network 1011 to other computing devices 1009 or 1010, and/or to external data sources 1012.

Instructions for performing those methods are stored in macroeconomic forecasting modules 1004, which may be encoded in a digital form on a computer-readable medium and stored in one or more storage components of the computing device 1001, such as the mass storage device 1002, the multimedia devices 1003, the input/output devices 1006, the memory 1007, the data source 1008, at locations accessible via the network 1011, or other places. In one embodiment, executable modules are loaded into a volatile memory 1007 in order to ensure fast processing of the module instructions. The modules may be executable on the central processing unit 1005 to automatically perform the desired procedures.

Data inputs used in the described methods may be stored in the various storage components of the computing device 1001 or at locations accessible via the network 1011. For example, the historical household survey data 101 or geodemographic segmentation data 102 of FIG. 1 may be stored in external data sources 1012, which may be the case if those data sets are offered by external vendors. Alternately, they may be stored locally on the computer, which may allow for faster access to the data.

When the described methods for generating household segment forecasts are performed on the processor 1005, the data may be used for various purposes according to embodiments of the invention. For example, the forecasts may be used to produce reports for a user, via the multimedia devices 1003 or the input/output devices 1006. Alternately, the forecasts may be used for further data analysis, such as those described with respect to FIGS. 8-9. The forecasts may also be used, with or without further analysis, to generate alerts. In one embodiment, the forecasting methods are executed in real time and/or on a periodic basis and used to generate alerts if the values reach a certain threshold. This may be used, for example, for regular monitoring of macroeconomic status.

In another embodiment, parts or all of the described methods are performed at the request of a user transmitted from an external user computing device 1009 or 1010 via the network 1011. In this embodiment, the computing device 1001 acts as a server, receiving client requests. For example, with regard to the method described in FIG. 1, the steps of data mapping and aggregation 103 to produce segment-level accounts 104 and/or the steps of generating the econometric models 106 may be precalculated with the results stored in the computing device 1001. The macroeconomic forecast assumptions 105 may be transmitted from a remote user computing device 1009, and then the computing device 1001 applies the econometric models to produce household segment forecasts 107, which are encoded and transmitted over the network 1011 back to the same user computing device 1009 or another user computing device (e.g. 1010). In another embodiment, all of the steps shown in FIG. 1 are performed when the user request is received. The user may provide all of the input data required to perform the requested methods, or some of the input data, or none of the input data, and the computing device 1001 may be configured to use internally stored data or externally located data to supplement data received from the user. It should be clear to those of ordinary skill in the art that any of the methods described in this specification may be performed, in whole or in part, in this manner.

Although the above description has focused on households as the units of analysis, it is contemplated that the invention is not necessarily so limited. Systems and methods analogous to those described could be applied to individual persons, businesses, local neighborhoods, occupants of residences or other structures, geographical areas, or other such divisions. Additionally, the analysis units, such as households, may be grouped together or clustered, so that the groups or clusters are analyzed, without departing from the spirit of the invention.

All references cited herein are intended to be incorporated by reference. Although the present invention has been described in terms of specific embodiments, it is anticipated that modifications and alterations to the invention will be apparent to those of ordinary skill in the art. It is thus intended that the above disclosure be construed as illustrative of embodiments of the invention and not restrictive of the invention, and that the scope of the invention be determined by the claims.

What is claimed is:

1. A method of forecasting household economic data based on a macroeconomic scenario, the method comprising:
   maintaining, in storage media of a computer, household survey records representing information about households;
   adding, to the storage media, geodemographic segment identifiers to the household survey records, so that each of the household survey records is associated with a geodemographic segment;
   aggregating, using a processor of the computer, the household survey records by the geodemographic segment identifiers to produce segment-level records; and
   applying, using the processor, an econometric model to the segment-level records, the econometric model using macroeconomic forecast assumptions related to the macroeconomic scenario, the econometric model producing economic forecasts for each of the geodemographic segments;
   wherein the produced economic forecasts include predicted income and expenditures for each of the geodemographic segments, the predicted income and expenditures relating to the macroeconomic scenario.

2. The method of claim 1, wherein adding the geodemographic segment identifiers to the household survey records comprises applying a geodemographic segmentation address lookup to the household survey records.

3. The method of claim 1, wherein adding the geodemographic segment identifiers to the household survey records comprises comparing characteristics of the household survey records to average characteristics associated with the geodemographic segments to determine matching geodemographic segments for the household survey records.

4. The method of claim 1, wherein the household survey records are grouped into household groups different from the geodemographic segments, and wherein adding the geodemographic segment identifiers to the household survey records comprises matching characteristics of the groups with characteristics associated with the geodemographic segments.

5. The method of claim 1, wherein applying the econometric model to the segment-level records comprises applying one or more macroeconomic models and/or macroeconomic satellite models.

6. The method of claim 1, wherein applying the econometric model to the segment-level records comprises applying one or more microeconometric and/or simulation models.

7. A computer system configured to construct an econometric model to forecast economic data for population segments, the system comprising:
   an input data source maintaining historical economic data for individual population units;
   a processor configured to communicate with the input data source;
   an aggregation module, stored on a computer-readable medium and configured, when executed on the processor, to combine the historical economic data with geodemographic segmentation data comprising geodemographic segments corresponding to the individual population units; and
   an analysis module, stored on the computer-readable medium and configured, when executed on the processor, to apply a statistical analysis procedure, using the historical economic data combined with the geographic segmentation data, to produce an econometric model configured to receive a set of macroeconomic variables and produce a forecast of economic data for each of the geodemographic segments.

8. The computer system of claim 7, wherein combining the historical economic data with the geodemographic segmentation data comprises applying a geodemographic segmentation address lookup to the historical economic data.

9. The computer system of claim 7, wherein combining the historical economic data with the geodemographic segmentation data comprises comparing characteristics of the historical economic data to characteristics associated with the geodemographic segmentation data to determine matching geodemographic segments for the historical economic data.

10. The computer system of claim 7, wherein the historical economic data is grouped into groups different from the geodemographic segments, and wherein combining the historical economic data with the geodemographic segmentation data comprises matching characteristics of the groups with characteristics associated with the geodemographic segments.

11. The computer system of claim 7, wherein applying the statistical analysis procedure comprises applying one or more macroeconomic models and/or macroeconomic satellite models.

12. The computer system of claim 7, wherein applying the statistical analysis procedure comprises applying one or more microeconometric and/or simulation models.

13. A method of predicting income and expenditures given macroeconomic situation assumptions, the method comprising:
   maintaining an econometric model on a computer storage device, the econometric model being constructed with historical economic data for households mapped to population segment data, the model configured to predict income and expenditures for population segments based on macroeconomic situation assumptions;
   applying, at a processor connected to the computer storage device, the econometric model to the given macroeconomic situation assumptions; and
   receiving income and expenditure predictions for one or more population segments as output from the econometric model.

14. The method of claim 13, further comprising:
   receiving household records belonging to a subgroup and associated with population segments;

identifying the income and expenditure predictions for the population segments associated with the household records; and aggregating the identified income and expenditure predictions, to produce an aggregated income and expenditure prediction for the subgroup.

15. The method of claim 13, further comprising:

receiving a household profile comprising subgroups of households;

determining, for each subgroup, the fractions of the subgroup corresponding to the geodemographic segments; and combining the income and expenditure predictions based on the determined fractions, to calculate subgroup income and expenditure predictions.

16. The method of claim 13, wherein the population segments are geodemographic household segments.

* * * * *